United States Patent Office 3,405,040
Patented Oct. 8, 1968

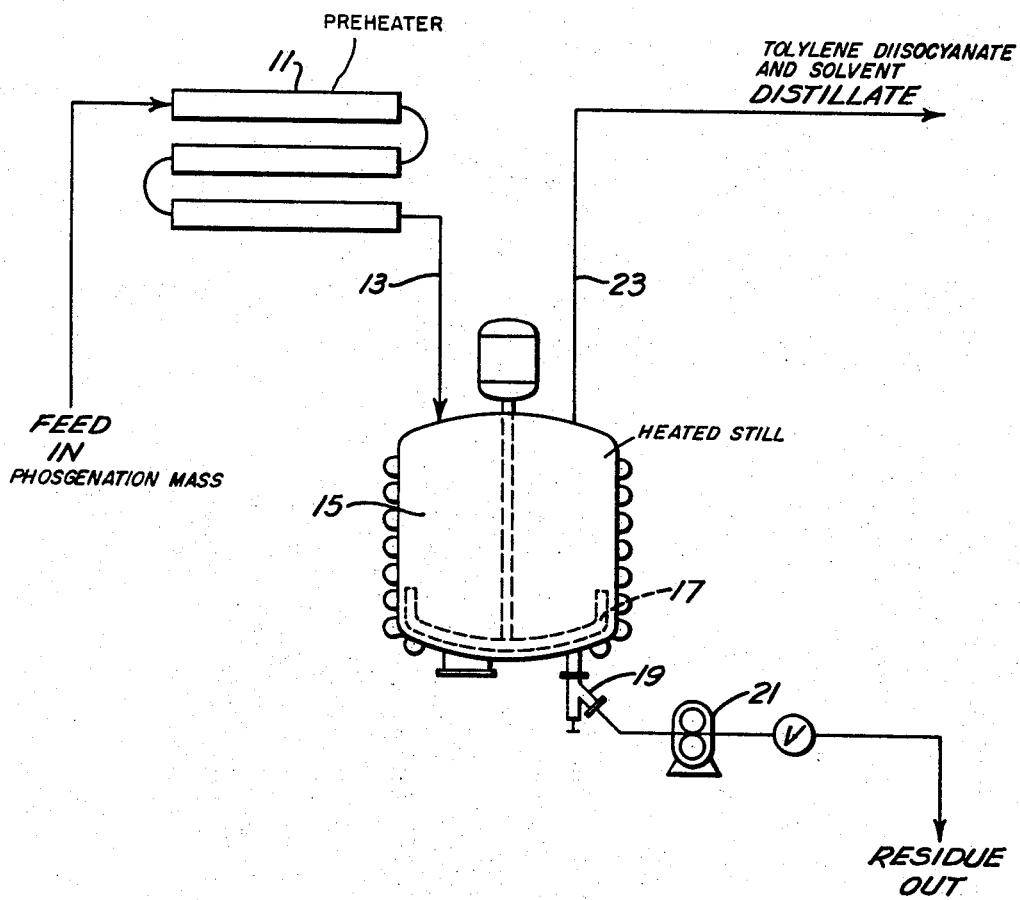

3,405,040
METHOD FOR RECOVERING TOLYLENE DIISOCYANATE
Raymond M. Ewald, New Martinsville, W. Va., assignor to Mobay Chemical Company, Pittsburgh, Pa., a corporation of Delaware
Filed Aug. 31, 1965, Ser. No. 484,038
4 Claims. (Cl. 203—88)

ABSTRACT OF THE DISCLOSURE

Continuous separation of tolylene diisocyanate from a crude mixture by heating, flash vaporizing, and introducing the mixture into a stirred heated chamber where tolylene diisocyanate and solvent are continuously separated from a residue containing not less than 10% tolylene diisocyanate, which residue is continuously pumped from the chamber.

---

This invention relates to an improvement in the process for preparing tolylene diisocyanates and more particularly, to a process for recovering tolylene diisocyanate from a crude mixture containing the same.

During this reaction, which is often carried out at elevated temperatures, and during subsequent steps for the treatment of the reaction mass to recover the organic isocyanates therefrom, which usually involves one or more distillation steps, various by-products and polymers of the desired organic isocyanates are produced which results in lower yield of the desired product. Although many attempts have been made to increase the yield of organic isocyanate and/or reduce the amount of undesired by-products and residues remaining, no completely satisfactory solution to the problem has thus far been found. For example, when a reaction mass is produced containing the desired organic isocyanate in an inert organic liquid diluent, and the said diluent and the major portion of the isocyanate are removed by distillation, a substantial amount of by-product is obtained as a result of polymerization and/or other undesirable side reactions during the main reaction and the subsequent distillation, which by-product both consumes and entraps considerable quantities of the desired organic isocyanate.

It has been heretofore known to add foreign materials that are liquid during the conditions of distillation to aid in the recovery of the isocyanate. This method however, requires the additional step of adding the substance and also increases the cost of operation because of the additional material.

It is therefore an object of this invention to provide an improved method of preparing tolylene diisocyanate. It is another object of this invention to provide an improved method for recovering the tolylene diisocyanate from crude mixtures containing the same. It is still another object of this invention to provide an improved method of preparing tolylene diisocyanate in increased yields. It is a further object of this invention to provide an improved method of separating tolylene diisocyanate from a crude reaction mass containing tolylene diisocyanate, inert solvent and side reaction residues. It is still a further object of this invention to provide an improved apparatus for carrying out the process of separating tolylene diisocyanate from the crude reaction mass. It is still another object of this invention to provide an improved method of handling and removing the heavy, viscous still bottoms.

The foregoing objects and others which will become apparent from the following description and the accompanying drawing are accomplished in accordance with the invention generally speaking by providing a method and apparatus for separating tolylene diisocyanate from crude mixtures comprising tolylene diisocyanate, inert solvent and residue obtained in the phosgenation of tolylene diamine, by heating the crude mixture, continuously introducing the heated mixture into a stirred, heated chamber, continuously separating the inert solvent and tolylene diisocyanate from the residue by distillation and continuously pumping the residue containing not less than 10% tolylene diisocyanate from the heated chamber. In accordance with the process of this invention, the crude reaction mass containing tolylene diisocyanate is passed through a heat exchanger where it is heated to a temperature of from about 180° C. to about 220° C., flash vaporized and then continuously introduced into a heated still maintained at a temperature of about 160 to about 185° C. under a vacuum of about 10 to about 40 mm. Hg. The residence time within the still is from about 1 hour to about 2 hours. The material within the still is continuously discharged by means of a heavy duty pumping means and the vaporized tolylene diisocyanate and inert solvent are recovered by condensation. Because of the heavy viscous nature of the residue, from which a large portion of the tolylene diisocyanate has been removed, and its tendency to solidify, it has been heretofore believed that this material could not be satisfactorily pumped. To avoid these problems, the prior art methods suggest adding high boiling liquids. In order to prevent the solidification of the residue within the still in accordance with this invention, the percent tolylene diisocyanate in the residue is permitted to remain at least 10% and preferably 15% which keeps the material sufficiently fluid to flow through the piping. Even when the residue contains as high as 20% tolylene diisocyanate, an improvement in yield is realized because the crude product is maintained at the high temperatures stated, only for short periods of time, thus resulting in a reduction of the formation of residue. The invention is also accompanied by the advantage that its operation is substantially free of human error in the timing of the removal of the residue from the still.

The invention is further illustrated by the accompanying drawing showing a preheater 11 wherein the crude reaction mixture containing from about 40 to 50% by weight tolylene diisocyanate, a substantial amount, such as, about 20 to 30% by weight inert solvent and about 30 to 40% by weight residue is heated to a temperature of from about 180 to about 220° C. and preferably about 200° C., followed by a flash vaporization zone. The mixture of liquid and vapor then passes through conduit 13 into the heated still 15 having an anchor shaped stirring mechanism 17 rotatably disposed therein. The liquid is preferably maintained at a level to just cover the anchor stirrer 17, thereby limiting the residence time. The material within the still 15 is continuously pumped through discharge outlet 19 by pumping means 21 disposed as close as possible to the still 15. Any suitable heavy pumping means such as, for example, a lobe pump, gear pump or the like can be used in this operation. The vaporized tolylene diisocyanate and inert solvent passes out of the still through conduit 23 and the solvent is separated from the tolylene diisocyanate by any suitable technique such as a fractionating column (not shown). The material continuously removed from the still has an approximate composition of about 85% by weight of residue and about 15% by weight of tolylene diisocyanate. Substantially all of the inert solvent is removed overhead. The level of the reaction mass within the still is maintained at a constant height by means of a capacitance probe or similar instrument thereby controlling the residence time within the still and preventing an increase in the formation of side reaction residue. For best results, it is preferred that the pumping means be located as close to the still as possible.

Example 1

A reaction mass is fed to the heat exchanger 11 at a rate of about 3597 lbs./hr. This reaction mass is composed of about 1505 lbs./hr. of tolylene diisocyanate, about 783 lbs./hr. of o-dichlorobenzene and about 1309 lbs./hr. of residue. Heat exchanger 11 is a double pipe exchanger with the process fluid in the inner pipe and 300 p.s.i.g. steam flowing in the annulus. The inner pipe consists of 12 ten-foot lengths of one-inch pipe, one ten-foot length of two-inch pipe, one ten-foot length of three-inch pipe and one ten-foot length of four-inch pipe, all connected in series. In the one-inch portion of the exchanger, sensible heat is added to raise the temperature to 200° C. In the two, three and four-inch sections, flash vaporization occurs with about 45% of the tolylene diisocyanate and orthene vaporizing. The effluent from heat exchanger 11 is immediately and continuously passed into the still 15 where the temperature is maintained at 170–175° C. The temperature within the still is maintained at this value by holding the still 15 under a controlled vacuum of 20 mm. Hg and heating with steam under pressure of about 650 p.s.i.g. The residue is pumped immediately from the still using a gear pump 21 operating at from about 10 to 80 r.p.m. The residue removed is at a temperature of 170–175° C. Tolylene diisocyanate and o-dichlorobenzene are removed over head by vaporization and condensation. Tolylene diisocyanate is recovered at a rate of about 1235 lbs./hr. O-dichlorobenzene is recovered at a rate of about 766 lbs./hr. About 1596 lbs./hr. of residue are removed by the pumping means. The residue contains about 240 lbs./hr. of tolylene diisocyanate, 17 lbs./hr. of o-dichlorobenzene and 1339 lbs./hr. of residue. This represents a tolylene diisocyanate recovery of about 82% compared to a recovery of 60 to 70% by the best previous method. In the above example, only 30 lbs./hr. of tolylene diisocyanate is converted into residue compared to about 265 lbs./hr. by the previous method.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. A method of separating tolylene diisocyanate from a crude mixture of a reaction mass formed in the phosgenation of tolylene diamine comprising said tolylene diisocyanate, a substantial amount of an inert solvent and residue which comprises heating said crude mixture reaction mass, flash vaporizing a portion of said mixture, continuously introducing said heated mixture of liquid and vapor into a stirred heated chamber, maintained at a temperature of from about 160° C. to about 185° C. and a pressure of from about 10 mm. Hg to about 40 mm. Hg, continuously separating said inert solvent and tolylene diisocyanate from said residue by distillation and continuously pumping said residue at a temperature of from about 160° C. to about 185° C. containing not less than 10% tolylene diisocyanate from said chamber.

2. The process of claim 1 wherein the residue contains 10% to 30% by weight of tolylene diisocyanate.

3. The process of claim 1 wherein the residue contains about 15% by weight of tolylene diisocyanate.

4. The method according to claim 1 wherein the crude mixture contains from about 20% to about 30% by weight inert solvent.

References Cited

UNITED STATES PATENTS

| | | | |
|---|---|---|---|
| 2,706,169 | 4/1955 | Beck | 203—88 |
| 2,911,429 | 11/1959 | Bloom et al. | 260—453 |
| 3,140,305 | 7/1964 | Lowenstein | 260—453 |
| 3,210,395 | 10/1965 | McDougall | 260—453 |
| 3,211,631 | 10/1965 | Fuchs | 260—453 |
| 3,219,678 | 11/1965 | Kober et al. | 260—453 |

NORMAN YUDKOFF, *Primary Examiner.*

F. E. DRUMMOND, *Assistant Examiner.*